US008264994B2

(12) United States Patent
Chan et al.

(10) Patent No.: US 8,264,994 B2
(45) Date of Patent: Sep. 11, 2012

(54) METHOD FOR SUPPORTING PAGING AND DEEP SLEEP WITH MULTIPLE RADIO INTERFACES

(75) Inventors: H. Anthony Chan, Plano, TX (US); Bin Shen, Shanghai (CN); Haiyong Chen, Shanghai (CN)

(73) Assignee: FutureWei Technologies, Inc., Plano, TX (US)

( * ) Notice: Subject to any disclaimer, the term of this patent is extended or adjusted under 35 U.S.C. 154(b) by 901 days.

(21) Appl. No.: 12/212,255

(22) Filed: Sep. 17, 2008

(65) Prior Publication Data

US 2009/0219846 A1 Sep. 3, 2009

Related U.S. Application Data

(60) Provisional application No. 61/032,715, filed on Feb. 29, 2008.

(51) Int. Cl.
*G08C 17/00* (2006.01)

(52) U.S. Cl. .......................................... 370/311; 370/465

(58) Field of Classification Search .......... 370/217–218, 370/225, 230, 230.1, 231, 235, 311, 328–329, 370/331, 437, 465, 347–348, 442–444
See application file for complete search history.

(56) References Cited

U.S. PATENT DOCUMENTS

| 6,085,090 A * | 7/2000 | Yee et al. ....................... 455/440 |
| 7,031,291 B2 | 4/2006 | Chen et al. |
| 7,035,234 B2 | 4/2006 | Toskala et al. |
| 7,349,355 B2 * | 3/2008 | Sengupta et al. ............. 370/311 |
| 7,471,942 B2 * | 12/2008 | Subramanian et al. ..... 455/343.2 |
| 7,991,409 B2 * | 8/2011 | Qi et al. ......................... 455/458 |
| 8,155,054 B2 * | 4/2012 | Narasimhan ................... 370/328 |
| 2001/0015963 A1 * | 8/2001 | Tuomainen et al. ........... 370/311 |
| 2004/0218555 A1 * | 11/2004 | Chen et al. .................... 370/311 |
| 2005/0002345 A1 * | 1/2005 | Pyo et al. ....................... 370/311 |
| 2007/0207806 A1 | 9/2007 | Shaheen |
| 2007/0207841 A1 | 9/2007 | Amerga et al. |
| 2007/0218889 A1 | 9/2007 | Zhang et al. |
| 2007/0250726 A1 | 10/2007 | Rossetti et al. |
| 2007/0268863 A1 | 11/2007 | Venkatachalam |
| 2008/0004044 A1 | 1/2008 | Simpson et al. |
| 2008/0014921 A1 | 1/2008 | Venkatachalam |
| 2008/0014968 A1 | 1/2008 | Yoon |

(Continued)

FOREIGN PATENT DOCUMENTS

EP 1589095 A1 10/2005

(Continued)

OTHER PUBLICATIONS

International Application No. PCT/CN2009/070510, International Search Report and Written Opinion, 9 pages, Jun. 4, 2009.

(Continued)

*Primary Examiner* — Chi H. Pham
*Assistant Examiner* — Kevin Mew
(74) *Attorney, Agent, or Firm* — Slater & Matsil, L.L.P.

(57) ABSTRACT

A method of paging for a wireless device with multiple radio interfaces corresponding to multiple access networks. The method provides a first interface from the multiple radio interfaces to listen to paging for the multiple radio interfaces; turns the rest of the multiple radio interfaces into deep-sleep mode; and maintains attachment for each of the deep-sleep interfaces to a corresponding serving base station or access point.

19 Claims, 4 Drawing Sheets

110

U.S. PATENT DOCUMENTS

| | | |
|---|---|---|
| 2008/0014981 A1 | 1/2008 | Venkatachalam |
| 2008/0069022 A1* | 3/2008 | Funato et al. .................. 370/311 |
| 2008/0096614 A1 | 4/2008 | Venkatachalam |
| 2008/0219199 A1* | 9/2008 | Kohlmann et al. ............ 370/311 |
| 2008/0219200 A1* | 9/2008 | Kohlmann et al. ............ 370/311 |
| 2008/0232288 A1* | 9/2008 | Venkatachalam et al. .... 370/311 |
| 2009/0052362 A1* | 2/2009 | Meier et al. ................... 370/311 |
| 2009/0059829 A1* | 3/2009 | Bachmann et al. ............ 370/311 |
| 2009/0219844 A1* | 9/2009 | Soliman ......................... 370/311 |
| 2009/0221261 A1* | 9/2009 | Soliman ........................ 455/343.2 |
| 2009/0221303 A1* | 9/2009 | Soliman ......................... 455/458 |
| 2010/0178869 A1* | 7/2010 | Mauney et al. ............... 455/41.2 |

FOREIGN PATENT DOCUMENTS

| | | |
|---|---|---|
| EP | 1841142 A1 | 10/2007 |
| WO | WO 01/52586 A1 | 7/2001 |
| WO | WO 2004/100599 A1 | 11/2004 |
| WO | WO 2007/110138 A1 | 10/2007 |

OTHER PUBLICATIONS

"Draft IEEE Standard for Local and Metropolitan Area Networks: Media Independent Handover Services," IEEE P802.21/D00.05, Jan. 2006, 169 pages.

* cited by examiner

METHOD FOR SUPPORTING PAGING AND DEEP SLEEP WITH MULTIPLE RADIO INTERFACES

CROSS-REFERENCE TO RELATED APPLICATIONS

This application claims the priority benefit of U.S. Provisional Application No. 61/032,715, filed Feb. 29, 2008.

TECHNICAL FIELD OF THE INVENTION

The present invention relates generally to telecommunications, and more particularly, to a method for supporting paging and deep sleep mode with multiple radio interfaces corresponding to multiple access networks.

BACKGROUND OF THE INVENTION

Wireless network technologies may use sleep mode in order to extend battery life of a wireless device. In sleep mode, a wireless device is powered off but may wake up regularly and briefly to check for paging and to perform any needed handshakes with a wireless network. Within the 2G and 3G wireless standards, dedicated digital channels, that are synchronized between a network and each individual wireless device, are used to enable a wireless device to respond to paging within a desired time constraint. In such networks, the need to respond to paging for time-sensitive applications requires wakeup intervals to be short, e.g., 0.4 second for voice calls. Battery life of a wireless device with one core network technology may be increased from merely one day without sleep mode to about one week with sleep mode.

Many applications which are time-sensitive have a stringent requirement on how fast a wireless device needs to establish active data transfer connection upon being paged. It is also necessary to track the location of a wireless device to the granularity of knowing a base station or an access point.

Wireless access networks are becoming diverse and wireless devices may have more than one multiple interfaces. In addition, these access networks may operate independently, may belong to different operators, or may be loosely coupled. Moreover, base stations or access points using different wireless technologies may not be collocated. A wireless device with multiple interfaces may drain power faster if paging corresponding to the multiple interfaces is handled separately. If two or more wireless interfaces run sleep mode independently but share a common battery source, battery life may be reduced by a factor of 2 or more, which may be unacceptable to some customers.

Therefore, what is needed is a method of paging that may conserve power for a wireless device with multiple radio interfaces corresponding to multiple wireless networks.

SUMMARY OF THE INVENTION

Embodiments of the present invention provide a method of paging for a wireless device with multiple radio interfaces corresponding to multiple access networks. The method provides a first interface from the multiple radio interfaces to listen to paging for the multiple radio interfaces; turns the rest of the multiple radio interfaces into deep-sleep mode; and maintains attachment for each of the deep-sleep interfaces to a corresponding serving base station or access point.

The following description and drawings set forth in detail a number of illustrative embodiments of the invention. These embodiments are indicative of but a few of the various ways in which the present invention may be utilized.

BRIEF DESCRIPTION OF THE SEVERAL VIEWS OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Figure 1:
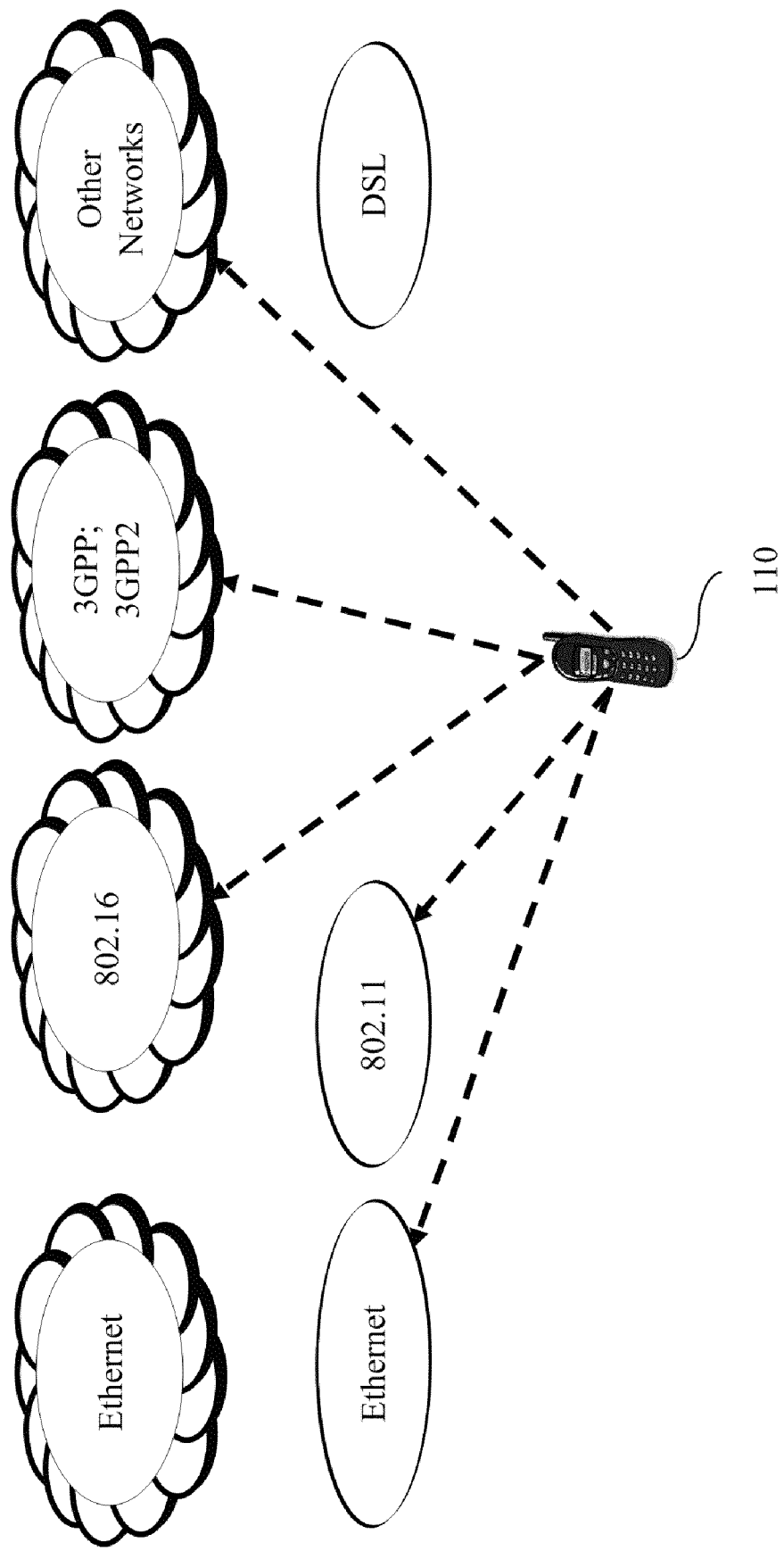
FIG. 1 depicts a diagram of a wireless device with multiple interfaces according to one embodiment of the present invention.
Figure 2:
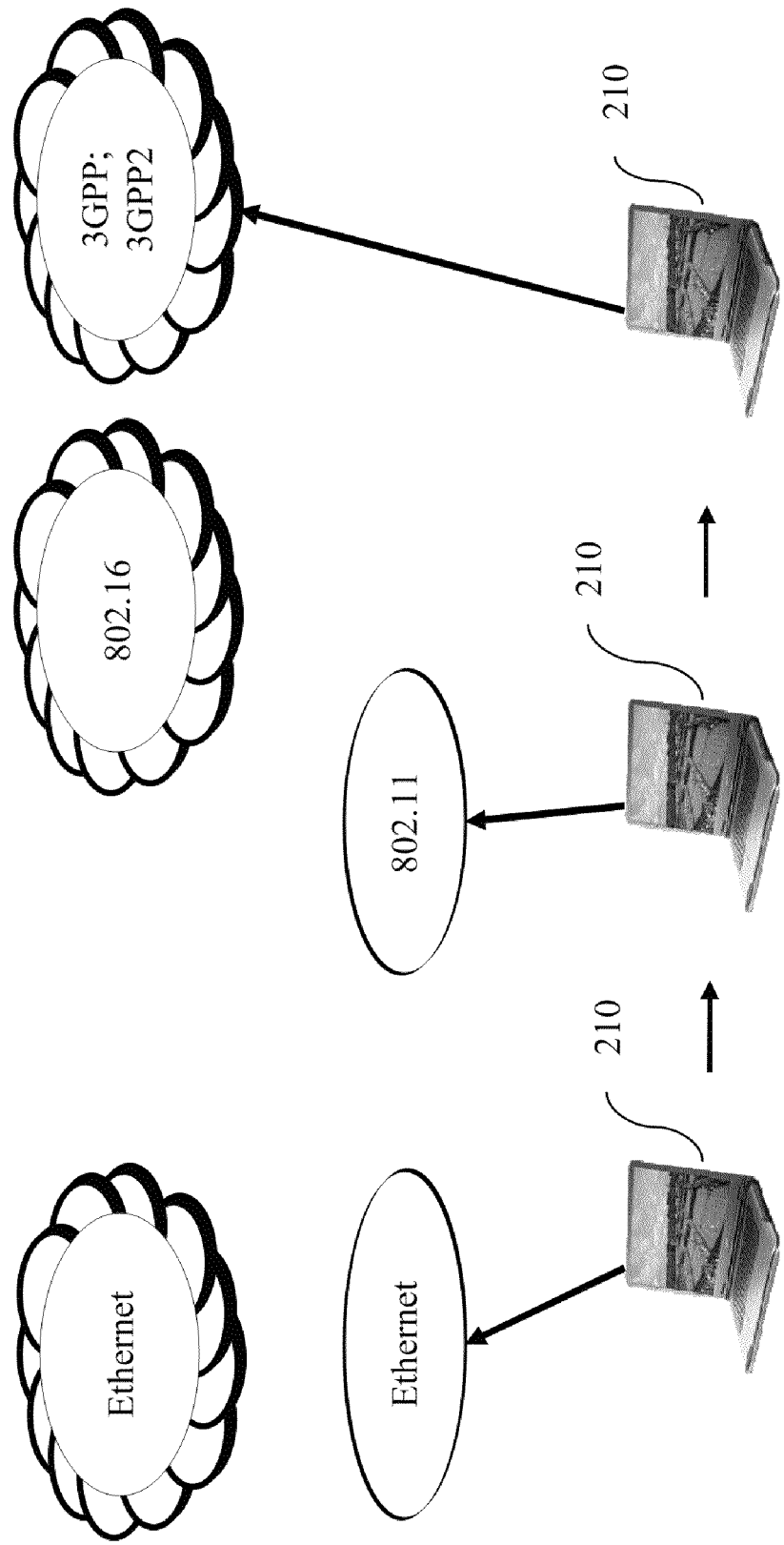
FIG. 2 depicts a diagram of a wireless device with multiple interfaces according to another embodiment of the present invention.

A wireless device may consist of multiple radio interfaces. Referring to FIG. 1 and FIG. 2, embodiments of a wireless device with multiple interfaces are illustrated, respectively. In FIG. 1, a cell phone 110 may have multiple interfaces correspondent to diverse access networks, such as an Ethernet, a 802.11 network, a 802.16 network, and a $3^{rd}$ Generation Partnership Project (3GPP) or 3GPP2 network, etc. In FIG. 2, a notebook 210 may also have multiple interfaces. When the notebook 210 is used without being moved around, the notebook 210 may have an interface for an Ethernet; when the notebook 210 is carried around within a building, such as an office, the interface of the notebook 210 may be involved with a 802.11 network; when the notebook 210 is moved around outside a building, it may have an interface correspondent to a 3GPP or 3GPP2 network.

Each interface may involve different wireless technologies, including, but not limited to, Global System for Mobile communication (GSM), General Packet Radio Service (GPRS), Long Term Evolution (LTE), Worldwide Interoperability for Microwave Access (WiMAX), Code Division Multiple Access (CDMA) 2000, and Wireless Local Area Network (WLAN), etc. These wireless technologies may use different wireless access technologies which include, but not limited to, Time Division Multiple Access (TDMA), Code Division Multiple Access (CDMA), or Orthogonal Frequency Division Multiple Access (OFDMA).

Each of the multiple radio interfaces may not be in active use for an extended amount of time, but needs to be able to respond to paging and to subsequently begin active data transfer with a fast response time according to each application.

In general, sleep mode operation has been used to conserve power. In sleep mode, a wireless device not actively transferring data is powered off, but may wake up regularly and briefly to check for paging signals and to perform any needed handshake with a wireless network.

The required response, such as in a voice call application, may be in a range of 0.4 second, thus there might be frequent paging and regular brief wakeups. Such frequent wakeups enable a network to keep track of a wireless device and to perform frequent handshakes with the wireless device. For example, in sleep mode of an existing 2G cellular system, handshaking is accomplished by allocating dedicated channels during the timeslots of such frequent wakeups to a wireless device from a base station within which the wireless device is in the wireless range. However, losing such channel information, such as when a device has moved outside the wireless range of its base station and has not successfully handed over to another base station, may require the wireless device to scan radio channels, which may require more power and more time.

Conventional methods keep one interface active for listening to paging while shutting off all other interfaces completely to conserve power of a wireless device. But if the wireless device moves outside a base station during this period, the wireless device may need to scan radio channels to get channel information. A conventional method is to collect channel information of neighboring cells of a serving cell of the wireless device, so that scanning of radio channels may be achieved faster. However, such channel information may not be available for a network. For example, an access point in hotspots may detect a few access points within its wireless range of 100 meters, but may not know all access points in a GSM cell of several kilometers in radio.

Figure 3:
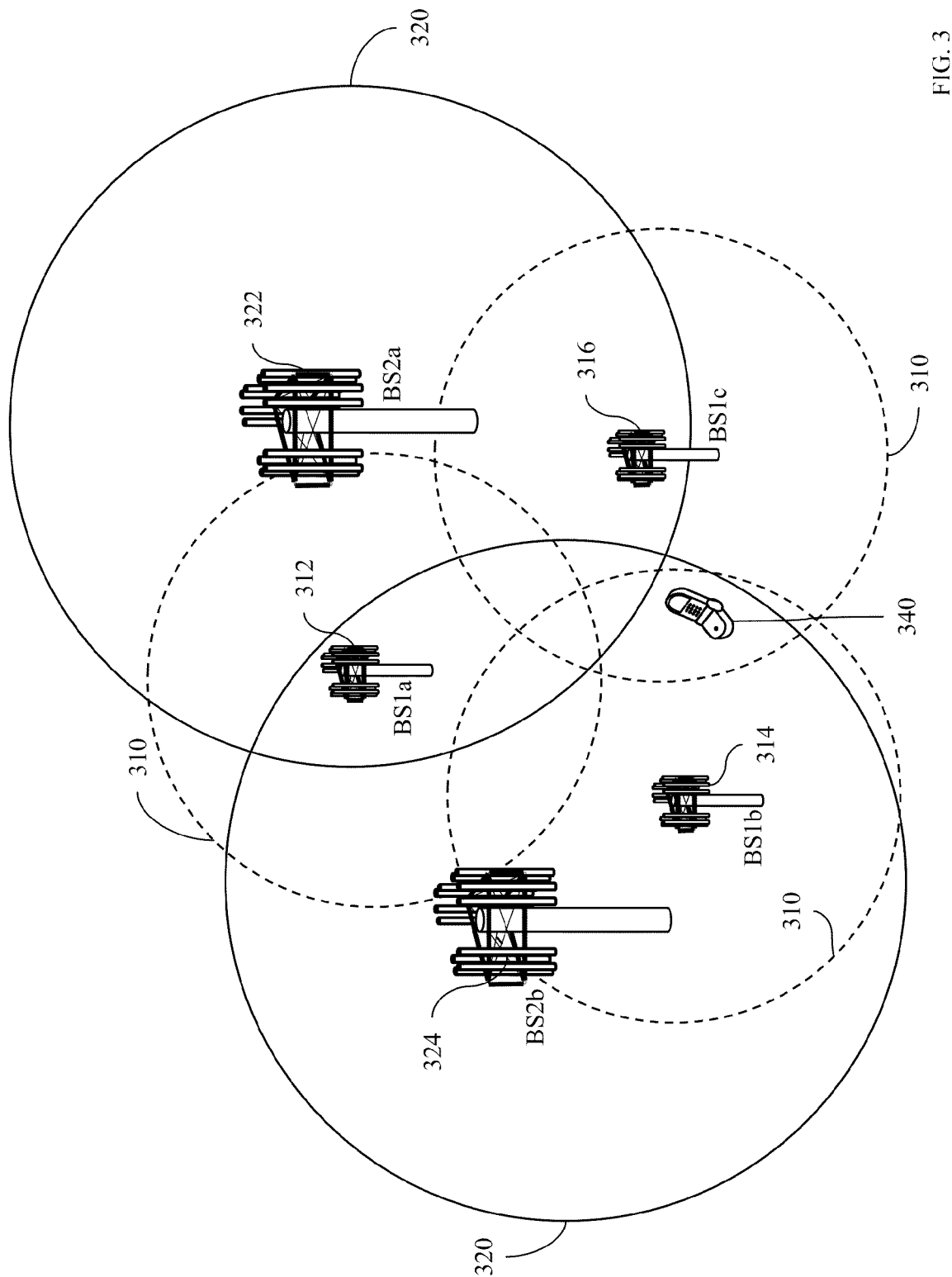
FIG. 3 depicts a diagram of different networks with different coverage according to one embodiment of the present invention.

Referring to FIG. 3, an embodiment of different networks with different coverage is illustrated. Network 1 310 and network 2 320 may be two networks using different technologies. Network 1 310 includes base stations BS1a 312, BS1b 314, and BS1c 316 with corresponding ranges shown by dashed circles, and network 2 320 includes base stations BS2a 322 and BS2b 324 with corresponding ranges shown by solid circles.

A mobile node, or a mobile device, 340, is inside the wireless range of BS2b 324, BS1b 314, and BS1c 316. Network 1 310 knows that the mobile node 340 is in the distance range of BS1b 314 and BS1c 316. Without knowing exact location of the mobile node 340, it is difficult for network 1 310 to know that the mobile node 340 is in the distance range of BS2b 324. Similarly, network 2 320 knows that the mobile node 340 is in the distance range of BS2b 324. However, without knowing the exact location of the mobile node 340, it is difficult for network 2 320 to know that the mobile node 340 is also in the distance range of the BS1b 314 and the BS1c 316.

Figure 4:
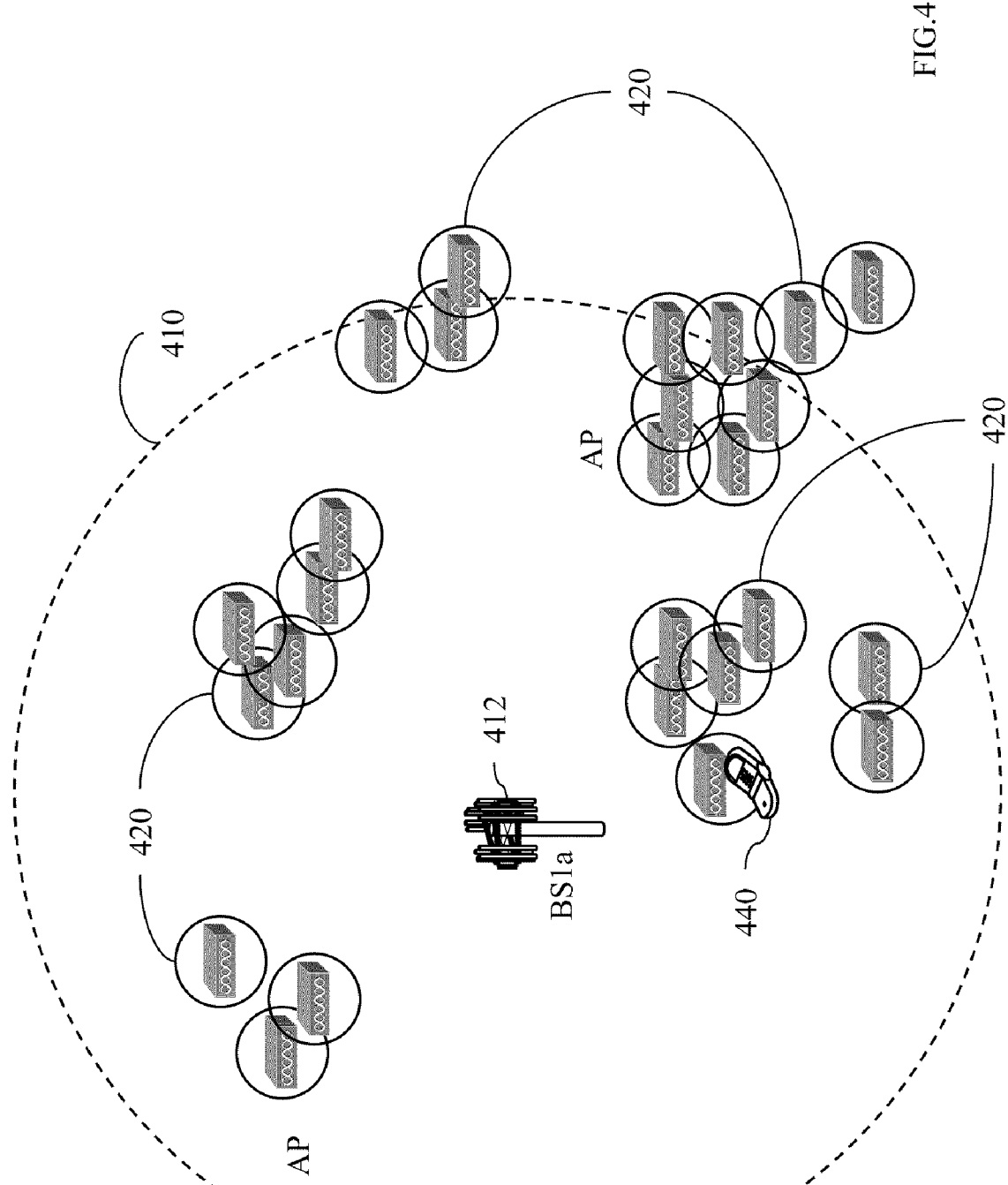
FIG. 4 depicts a diagram of different networks with different coverage according to another embodiment of the present invention.

FIG. 4 illustrates another embodiment of different networks with different coverage. A mobile node 440 is within the wireless range, shown by a dashed circle, of a base station BS1a 412 of a network 410, and also within the distance range of an Access Point (AP) of another network 420. The distance range of network 420 is shown by solid circles.

Network 410 knows that the mobile node 440 is in the distance range of BS1a 412, however, without knowing the exact location of the mobile node 440, it is difficult for network 410 to know that the mobile node 440 is in the distance range of a certain AP.

For a wireless device with multiple radio interfaces corresponding to multiple access networks, embodiments of the present invention may use one of the multiple interfaces to listen to paging, while turning all other interfaces into deep-sleep mode. Paging for the other interfaces may go through this interface to wake up relevant deep-sleep interfaces.

In one embodiment, when there is no active network session for all interfaces in a wireless device, one interface may be kept in normal-sleep mode to listen to paging for itself and on behalf of the other interfaces. The other interfaces are put into deep-sleep mode.

Alternatively when there is an active network session in an interface of the wireless device, this interface may be used to listen to paging for itself and on behalf of the other interfaces, which may be put into deep-sleep mode.

For example, a wireless device may have a 3GPP interface and a WiMAX interface. The wireless device is subscribing to WLAN services and to WiMAX services separately, so that paging from these different services will page through a 3GPP network and a WiMAX network, respectively. When the wireless device is idling, the 3GPP interface may be put into normal-sleep mode, and listen to paging for itself and on behalf of the WiMAX interface which may be put into deep-sleep mode.

The interface in the normal-sleep mode wakes up at intervals which are synchronized with its network and which are short enough to enable a sufficiently fast response to paging. This interface may send messages to notify other networks that paging for the other interfaces will all go through this normal-sleep interface. When this interface receives a paging message for another interface, it will wake up that interface.

Different network technologies corresponding to different interfaces may operate separately, and may be largely independent of each other. Messages may be exchanged between different networks and between a network and an interface. A message may include, but is not limited to, information about identifier of an interface, and information about which interface is in active mode, in normal-sleep mode, or in deep-sleep mode. A message may also ask a base station of a normal-sleep interface to page a particular interface in deep sleep, or ask a wireless device to wake up a deep-sleep interface and forward paging information to that deep-sleep interface.

Messages may be exchanged in various ways, for example, one way to exchange the messages is through the use of the IEEE P802.21 Media Independent Handover specification. Other means of exchanging these messages are possible. When messages are exchanged at an Internet Protocol (IP) layer, a network may use any mobility management protocol that is above the IP layer.

When sending a paging message to a deep-sleep interface, the message may include channel information for the deep-sleep interface to handshake with its access network. The information may be optional because different access networks may be allowed to operate independently in the present invention, and one network does not necessarily know which base station or access point of another network is serving the deep-sleep interface.

In the deep-sleep mode, an interface may still maintain attachment to its base station or access point, for example, by waking up at synchronized intervals frequently enough to perform handshakes, and thus the interface may establish active network connection rapidly when being forwarded a paging message. The interface and its access network entity therefore know which channel to check when the wireless device wakes up from deep sleep. The interface then may not need to perform channel scanning which may cause excessive delay to respond to paging.

During the handshake in the deep-sleep mode, an access network may optionally convey information about channels, base stations, or access points that are in the neighborhood of the device. Such information may be used by the interface performing the handshake to attach to a new cell if the wireless device of the interface has moved to a different cell between successive wakeup handshakes.

The sleep interval between wakeups may vary according to different needs. A sleep interval may be short when being paged for time-sensitive applications, including, but not limited to, voice calls. For voice calls, the required response time requires a short sleep interval, such as 0.4 second. An interface needs to wake up at such an interval to ensure data connection is established fast enough when being paged.

A sleep interval between wakeups to track a wireless device to its serving base station or access point may be much longer than the above short interval. Most wireless devices do not leave their cell very frequently. A user with WLAN connected to a hotspot is most likely not to leave the same access point for tens of minutes or hours. Even a moving motor vehicle traveling at 120 km per hour takes 5 minutes to leave a 10 km radius cell. Depending on the rate of mobility and the size of a cell, a wireless device may need to check for paging much less frequently. Battery usage of the device during the wakeup periods may therefore be close to being negligible when compared with that used by an interface that wakes up every a short interval.

A wireless device in deep sleep thus may wake up over much longer intervals. These much less frequent wakeups to accomplish handshakes are sufficient for a base station or an access point to determine whether a wireless device has moved out of the range of a serving cell. The percentage of time to be awake in such deep-sleep mode is so small that the amount of network usage used during the awake state is also very small per interface. A network may therefore optionally allocate deep-sleep mode awake channel slots for individual wireless devices to enable such infrequent handshakes. A base station and a wireless devices that the base station is serving are then able to maintain channel synchronization.

The sleep interval between wakeups for an interface in deep-sleep mode may be adjusted dynamically. The deep-sleep interval may be much longer when a mobile device is hardly moving, and be less long when the mobile device is fast moving. Determination of a deep-sleep interval of an interface may take into account of the motion of a wireless device, and the size of a cell in the network of the interface.

When a deep-sleep interface is being waked up by paging through a normal-sleep interface, the deep-sleep interface is still in synchronization with a base station or an access point. The deep-sleep interface may then perform a handshake much faster. For example, since the deep-sleep interface knows the paging and access channel slots, it may use a random access channel to notify a network that it has waked up. The channel may send to the wireless device, through paging or broadcasting, channel information to set up data transfer in this case. The response is fast since there is no need to search for the radio channel.

The embodiments of the present invention allow for as much flexibility as possible for different access networks serving different interfaces of a wireless device. Each interface in either normal sleep or deep sleep is performing its own handoff independently of the other interfaces. Therefore, different interfaces are not required to belong to the same paging group, to share the same identifier or the same IP address.

Furthermore, and for the same reason stated above, different interfaces within a wireless device may use different IP based mobility protocols. Even when different interfaces are both using mobile IP as mobility protocol, one interface may use client based mobile IP, whereas another interface may use proxy mobile IP, and different home addresses and/or different care-of-address for routing and tunneling may be used.

The networks may be the same network or different networks. The networks may have separate structures, may be independent of each other, may differ in cell configuration, locations, and paging mechanisms. In addition, there is no need to add extra components in or make changes to the networks and related devices.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of paging for a wireless device with multiple radio interfaces corresponding to multiple access networks, the method comprising:

setting, by the wireless device, a first interface from the multiple radio interfaces to listen to paging for the multiple radio interfaces and to control wake up of a rest of the multiple radio interfaces, wherein the first interface is in normal-sleep mode during a first time period when the wireless device has no active network session; and turning, by the wireless device, the rest of the multiple radio interfaces into deep-sleep mode, the rest of the multiple radio interfaces maintaining attachment to corresponding serving base stations or access points.

2. The method of claim 1, wherein if the first interface receives a paging message for a second interface in the multiple radio interfaces, the first interface wakes up the second interface.

3. The method of claim 2, wherein the first interface forwards the paging message to the second interface.

4. The method of claim 2, wherein the paging message comprises channel information for the second interface to handshake with an access network of the second interface.

5. The method of claim 1, wherein the first interface notifies the access networks corresponding to the rest of the multiple interfaces that the first interface listens to paging for the rest of the multiple radio interfaces.

6. The method of claim 1, wherein the first interface has an active network session during a second time period.

7. The method of claim 1, wherein a deep-sleep interval of each of the multiple radio interfaces is adjustable.

8. The method of claim 7, wherein the deep-sleep interval of one of the multiple radio interfaces is adjusted considering motion of the wireless device, or size of a cell of an access network corresponding to the radio interface.

9. The method of claim 1, wherein the multiple access networks are independent of each other.

10. The method of claim 1, wherein the multiple access networks are different from each other.

11. The method of claim 1, wherein the multiple radio interfaces belong to different paging groups, or share different identifiers or different Internet Protocol (IP) addresses.

12. A method of paging for a wireless device with multiple radio interfaces corresponding to multiple access networks, the method comprising:

setting, by the wireless device, a first interface from the multiple radio interfaces to listen to paging for the multiple radio interfaces and to control wake up of a rest of the multiple radio interfaces; and turning, by the wireless device, the rest of the multiple radio interfaces into deep-sleep mode, the rest of the multiple radio interfaces maintaining attachment to corresponding serving base stations or access points;

placing, by the wireless device, the first interface into an active network session for a first time period;

turning, by the wireless device, the first interface into normal-sleep mode for a second time period when the wireless device has no active network session; and wherein the first interface wakes up a second interface in the multiple radio interfaces when receiving a paging message for the second interface, and sends the paging message to the second interface.

13. The method of claim 12, wherein the message comprises channel information for the second interface to handshake with an access network of the second interface.

14. The method of claim 12, wherein the first interface notifies the access networks corresponding to the rest of the multiple interfaces that the first interface listens to paging for the rest of the multiple radio interfaces.

15. The method of claim 12, wherein a deep-sleep interval of each of the multiple radio interfaces is adjustable.

16. The method of claim 15, wherein the deep-sleep interval of one of the multiple radio interfaces is adjusted considering motion of the wireless device, or size of a cell of an access network corresponding to the radio interface.

17. The method of claim 12, wherein the multiple access networks are independent of each other.

18. The method of claim 12, wherein the multiple access networks are different from each other.

19. The method of claim 12, wherein the multiple radio interfaces belong to different paging groups, or share different identifiers or different Internet Protocol (IP) addresses.

* * * * *